United States Patent [19]
Nakano

[11] Patent Number: 6,126,232
[45] Date of Patent: Oct. 3, 2000

[54] REAR BODY STRUCTURE OF A VEHICLE

[75] Inventor: Takashi Nakano, Saitama-ken, Japan

[73] Assignee: Honda Giken Kogyo Kabushiki Kaisha, Tokyo, Japan

[21] Appl. No.: 08/425,293

[22] Filed: Apr. 20, 1995

[30] Foreign Application Priority Data

May 2, 1994 [JP] Japan .................................. 6-093363

[51] Int. Cl.⁷ ........................................... B60J 7/00
[52] U.S. Cl. .................... 296/210; 296/187; 296/188; 296/193; 296/195; 296/202; 296/203.01; 296/204; 296/205; 296/203.02; 296/203.04; 296/29; 296/30
[58] Field of Search ................................. 296/187, 188, 296/193, 195, 202, 203, 205, 210, 29, 30

[56] References Cited

U.S. PATENT DOCUMENTS

| | | | |
|---|---|---|---|
| 3,833,254 | 9/1974 | Renner | 296/210 |
| 4,775,181 | 10/1988 | Shoda | 296/203 |

FOREIGN PATENT DOCUMENTS

| | | |
|---|---|---|
| 61-68972 | 5/1986 | Japan . |
| 3-45903 | 9/1991 | Japan . |
| 4-23109 | 5/1992 | Japan . |
| 4-118881 | 10/1992 | Japan . |

*Primary Examiner*—Christopher P. Ellis
*Assistant Examiner*—Jeffrey A. Shapiro
*Attorney, Agent, or Firm*—Carrier, Blackman & Associates, P.C.; Joseph P. Carrier; William D. Blackman

[57] ABSTRACT

A box-shaped structure is defined by an inner projection of a rear inner panel forming a side portion of a vehicle body and a roof rail outer member of a roof rail extending transversely of the vehicle body at an upper portion of a rear part of the roof rail. The box-shaped structure includes as bracing an outer projection of a rear pillar stiffener for reinforcing the rear inner panel and a stiffener projection of a hinge stiffener for reinforcing the roof rail outer member, which extend diagonally within the box-shaped structure to thereby divide the structure into a plurality of closed sections. A rear portion of the rear inner panel and the rear panel stiffener joint comprise a rear pillar. With the structure thus constructed, the connection between the rear pillar and the roof rail will be imparted increased stiffness against a twisting stress and against external stresses applied from the directions of the corners of the closed sections.

15 Claims, 7 Drawing Sheets

(I) Present Invention

FIG. 7

(II) Comparative Example

FIG. 8

Section modulus in vertical and horizontal directions (Z1)

$$Z1 = \frac{1}{6} \cdot \frac{h_2^4 - h_1^4}{h_2}$$

Section modulus in diagonal directions (Z2)

$$Z2 = \frac{\sqrt{2}}{12} \cdot \frac{h_2^4 - h_1^4}{h_2}$$

REAR BODY STRUCTURE OF A VEHICLE

FIELD OF THE INVENTION

The present invention relates to an improvement in a rear body structure of a vehicle such as an automobile of the so-called hatch-back type which has a door at a rear end surface thereof.

DESCRIPTION OF THE RELATED ART

A rear body structure of a hatch-back type vehicle having a door at a rear end surface thereof is known, for example, from Japanese Utility Model Post-Exam Publication No. 4-23109. This publication describes a mode of connection of an upper portion of a rear pillar of the rear body structure.

It can be noted from FIG. 1 of Japanese Publication No. 4-23109 that the invention described therein is directed to a rear header (corresponding to a roof rail), which extends between upper portions of a right and left rear pillar in the rear portion of the vehicle body.

As shown in FIG. 3 of the publication, the rear header is formed by joining a rear header upper member and a rear header inner member to define a closed section (box-shaped section). By a first extension from the rear pillar, the closed section of the rear header is partitioned in a longitudinal direction with respect to the vehicle body, to be divided into two to thereby produce increased stiffness against a twisting stress. The reference numerals used here are those of the publication.

Figure 9:
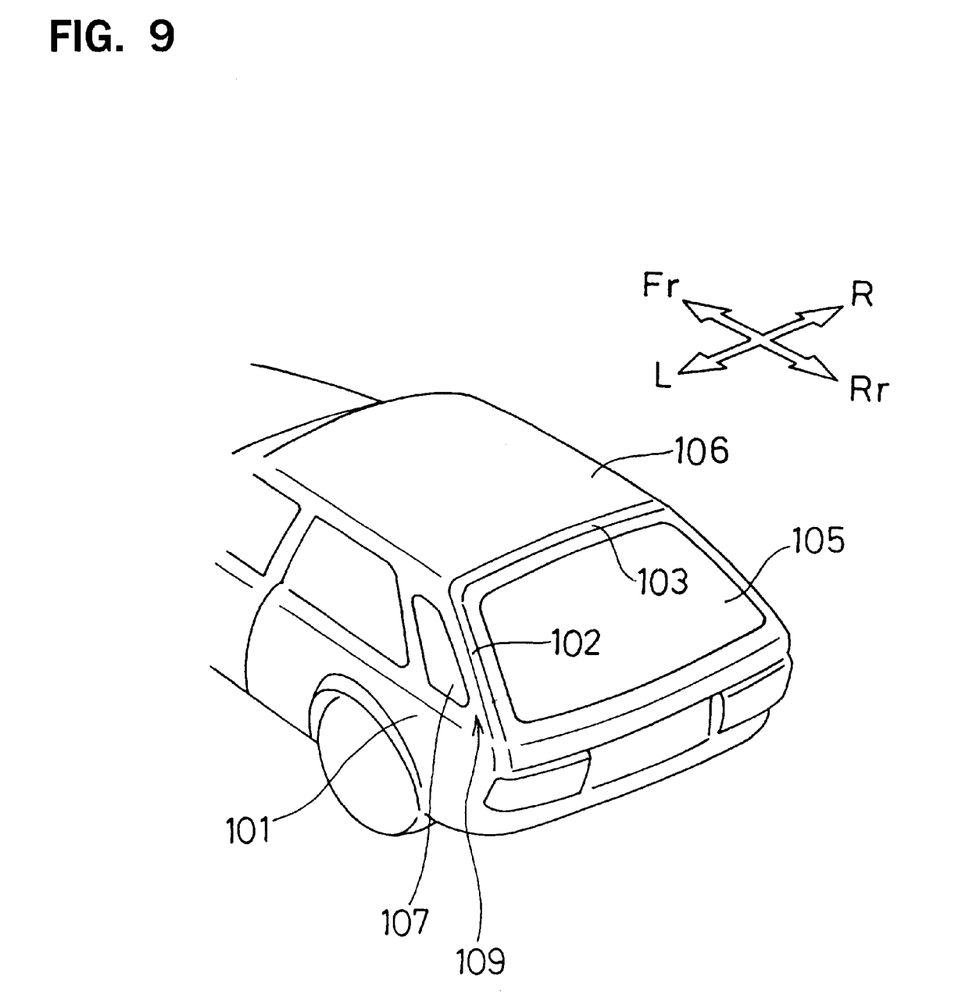
FIG. 9 is a perspective view illustrating the rear body of an ordinary hatch-back type vehicle.
Figure 10:
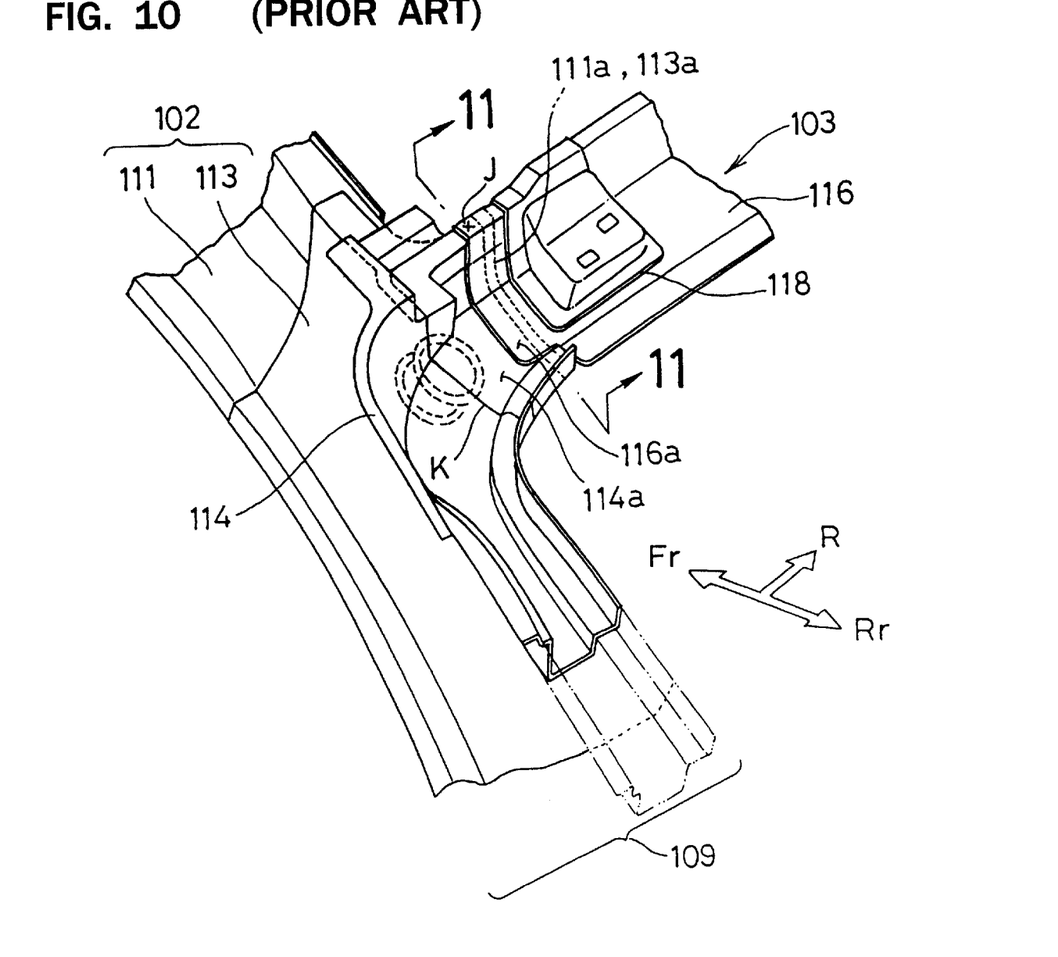
FIG. 10 is a perspective view illustrating the connection between the rear pillar and the roof rail in a rear body structure of a known vehicle.
Figure 11:
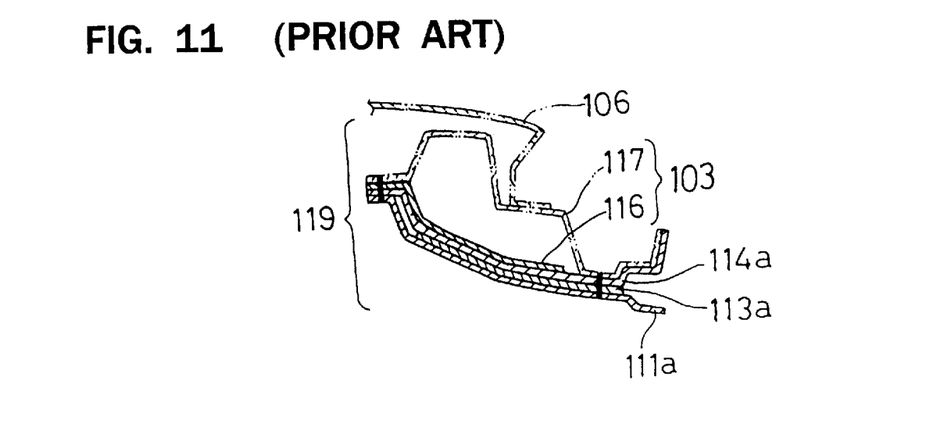
FIG. 11 is a sectional view taken along line 11—11 of FIG. 10.

Another or second known structure is shown in FIGS. 9 through 11 of the accompanying drawings.

FIG. 9 is a duplicate of FIG. 6 of the Publication No. 4-23109 but, for illustrating the second known structure, shows schematically a rear portion of a body of the hatch-back type vehicle.

It should be noted that the terms "front", "rear", "left" and "right" represent directions as viewed from a vehicle driver. In FIG. 9, the characters "Fr", "Rr", "L" and "R" respectively mean a front side, rear side, left side and right side of the automobile, as represented by arrows.

As shown in the figure, a rear pillar 102 is positioned at an end of a rear panel 101 forming a rear side portion of the vehicle body. From an upper part of the rear pillar 102, a roof rail 103 extends transversely of the body at an upper portion thereof, Reference numeral 105 represents a rear or back door, which is connected to the roof rail 103 by means of a hinge mechanism (not shown) allowing opening and closing movements of the door. Reference numerals 106, 107 and 109 respectively represent a roof panel a quarter window and a side panel combination.

FIG. 10 schematically illustrates a connection between the rear pillar and the roof rail at a rear left corner of a body structure according to the second known structure. The side panel combination 109 comprises the rear pillar 102 having a rear inner panel member 111 at a lower level and a rear outer panel member, not shown, at an upper level, a rear pillar stiffener 113 reinforcing a rear portion of the rear inner panel 111, and a rear pillar gutter 114 above the rear pillar stiffener 113.

The rear pillar 102 is a combination of a rear portion of the rear inner panel member 111 and the rear pillar stiffener 113.

The rear inner panel member 111, rear pillar stiffener 113 and rear pillar gutter 114 are bent or inclined inwardly toward the center of the vehicle body to respectively provide an inner projection 111a, an outer projection 113a and a gutter projection 114a. These projections 111a, 113a and 114a are laid one over the other in a laminated fashion and joined together by spot welding.

The roof rail 103 comprises a lower roof rail inner member 116 and a roof rail outer member 117 as shown in FIG. 11.

An end 116a of the roof rail inner member 116 is laid on and weld connected to the gutter projection 114a and the connection is made more firm by spot welding as at "J".

The roof rail inner member 116 carries at a portion proximate to its end 116a, a reinforcing hinge stiffener 118 to which a hinge mechanism, not shown, for the back door will be mounted.

The rear pillar gutter 114 includes the gutter projection 114a projecting inwardly toward the center of the vehicle body. If the gutter projection 114a is formed integrally with the rear pillar gutter 114, the overall configuration will be complex, and difficulty will be experienced in its manufacture. Thus, the gutter projection 114a is at present formed separately from the rear pillar gutter 114 and joined and connected to the latter by welding as at reference character "K", resulting in limited productivity.

FIG. 11 is a sectional view taken along line 11—11 of FIG. 10 and shows a box-like structure 119 defined jointly by the inner projection 111a, outer projection 113a, gutter projection 114a and roof rail outer member 117.

The rear body structure according to (Japanese Utility Model Post-Exam Publication No. 4-23109) provides sufficient stiffness against an external stress applied in longitudinal (front-to-rear) and vertical (top-to-bottom) directions with respect to the vehicle body and against a twisting stress. However, in this arrangement, it is necessary to increase stiffness against an external stress applied in a diagonal direction, that is, from the direction of each corner of the closed section.

In the second known structure as shown in FIG. 9 through FIG. 11, the upper part of the rear pillar and the roof rail are connected in such manner as to present a box-shaped structure 119, As a result, the arrangement produces sufficient stiffness against an external stress applied in vertical and longitudinal directions. However, such stiffness is insufficient with respect to a twisting stress, as well as to a stress applied diagonally or from the direction of each corner of the box-shaped structure 119.

Use of a separate reinforcement member to achieve improved stiffness in the arrangements according to the Publication No. 4-23109 and the second known structure will result in a complex structure, leading to limited productivity.

SUMMARY OF THE INVENTION

The present invention has been made with a view to avoid such insufficiency and resulting inconveniences.

It is therefore an object of the invention to provide a rear structure of a vehicle body, in which the connection between the upper part of the rear pillar and the roof rail has improved stiffness. Specifically, the invention aims to provide such rear body structure employing a closed section arrangement which provides improved stiffness at the connection between the upper part of the rear pillar and the roof rail, without requiring use of an additional member to achieve such stiffness, and hence is simple in construction.

The invention relates to an improvement in a rear body structure of a vehicle such as a hatch-back type automobile. Specifically, the invention provides a rear structure of a vehicle body, comprising: a rear inner panel forming a rear side portion of the body and having an inner projection partially bent transversely inwardly of the body; a rear pillar stiffener for reinforcing the rear inner panel, the rear pillar stiffener having an outer projection partially bent transversely inwardly of the body; and a roof rail disposed at an upper portion of the rear body structure, the roof rail including an upper roof rail outer member and a lower roof rail inner member, the roof rail outer member having a hinge stiffener as a reinforcing member, which has a stiffener projection projected transversely outwardly of the body, the inner projection, the outer projection and the stiffener projection being laid one over the other in the given order and joined together at their ends, the inner projection positioned at the bottom and the roof rail outer member positioned at the top jointly defining a box-shaped structure with bracing means diagonally extending within the box-shaped structure, whereby a plurality of closed sections are provided within the box-shaped structure.

The bracing means positioned diagonally within the box-shaped structure may be selected to be either the stiffener projection or the outer projection, or both of these.

Since the inner projection of the rear inner panel and the roof rail outer member are joined together to define the box-shaped structure, it is possible to provide improved stiffness at the connection between the rear pillar and the roof rail against stresses applied to the body in longitudinal and vertical directions. Particularly, since the outer projection and/or the stiffener projection are arranged to run diagonally within the box-shaped structure to thereby serve as brace means dividing the box-shaped structure into a plurality of closed sections, the connection between the rear pillar and the roof rail will have increased stiffness against a twisting stress and external stresses applied to the corners of the closed sections.

Moreover, since the box-shaped structure is provided with the outer projection and/or the stiffener projection disposed diagonally therein and thus acting as brace means, no additional reinforcing members will be required, resulting in the structure having a simplified construction.

DETAILED DESCRIPTION

A preferred embodiment of the invention will now be described with reference to the accompanying drawings.

Figure 1:
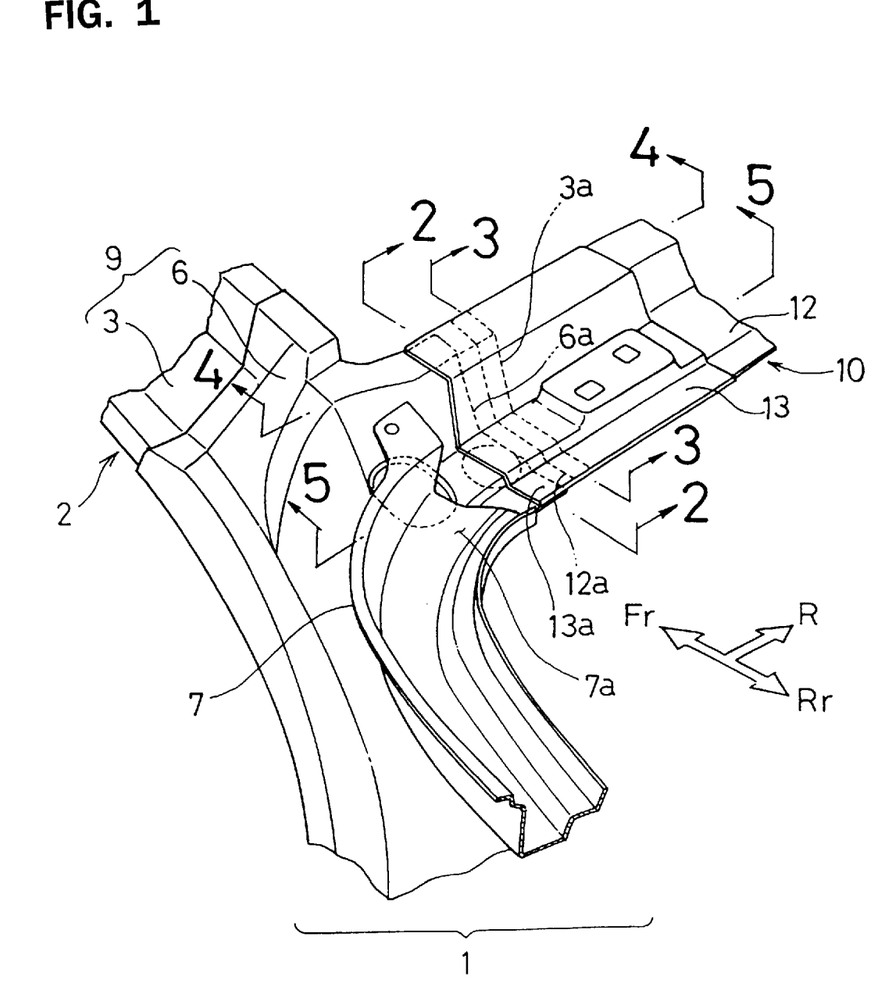
FIG. 1 is a perspective view illustrating the connection between the rear pillar and the roof rail of the rear body structure according to a preferred embodiment of the invention, with the rear outer panel and the roof panel being taken away.

The terms "front", "rear", "left" and "right" are used herein to represent directions as viewed from a driver as in the description relative to the discussed known structures foregoing prior art. In the drawings, the letters "Fr", "Rr", "L" and "R" appearing with arrows mean a front, rear, left and right side, respectively, FIG. 1 is a perspective view showing the connection between a rear pillar and a roof rail of a rear body structure according to the invention, the connection being an improvement of the arrangement of FIG. 9. In this figure, only a left side of the rear body is shown.

Figure 4:
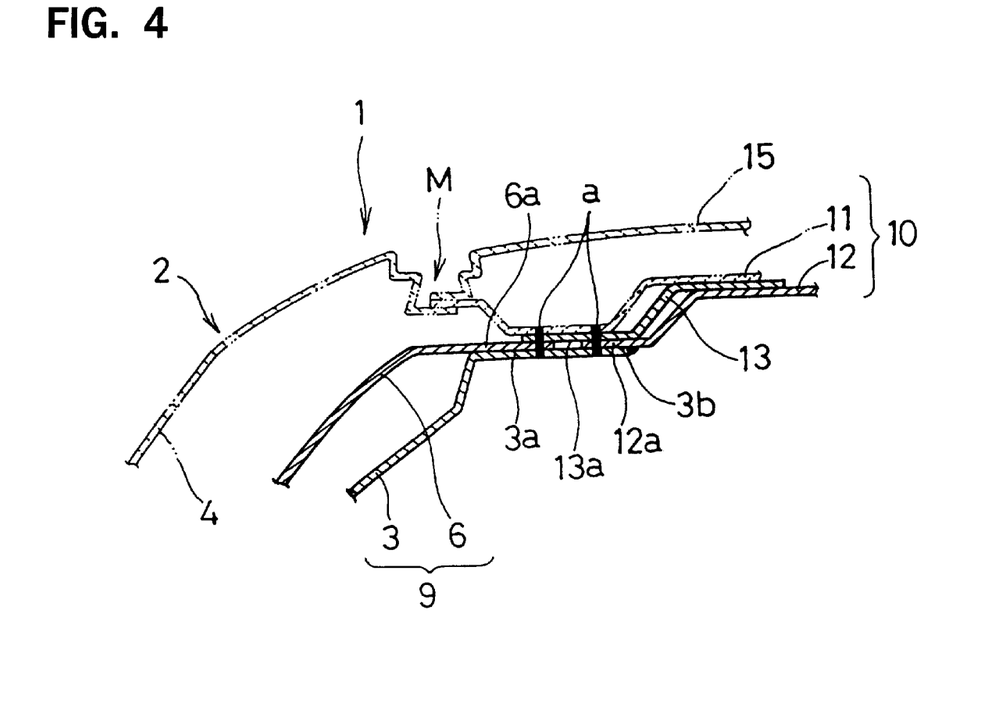
FIG. 4 is an enlarged sectional view taken along line 4—4 of FIG. 1.

A side panel combination 1 includes a rear panel 2 forming a rear portion of a vehicle body, a rear pillar stiffener 6 for reinforcing a rear inner panel 3 and a rear pillar gutter 7 above the rear pillar stiffener 6. The rear panel 2 includes the inwardly disposed rear inner panel 3 and an outwardly disposed rear outer panel 4, as shown in FIG. 4.

A rear pillar 9 is a combination of a rear portion of the rear inner panel 3 and the rear pillar stiffener 6.

Figure 5:
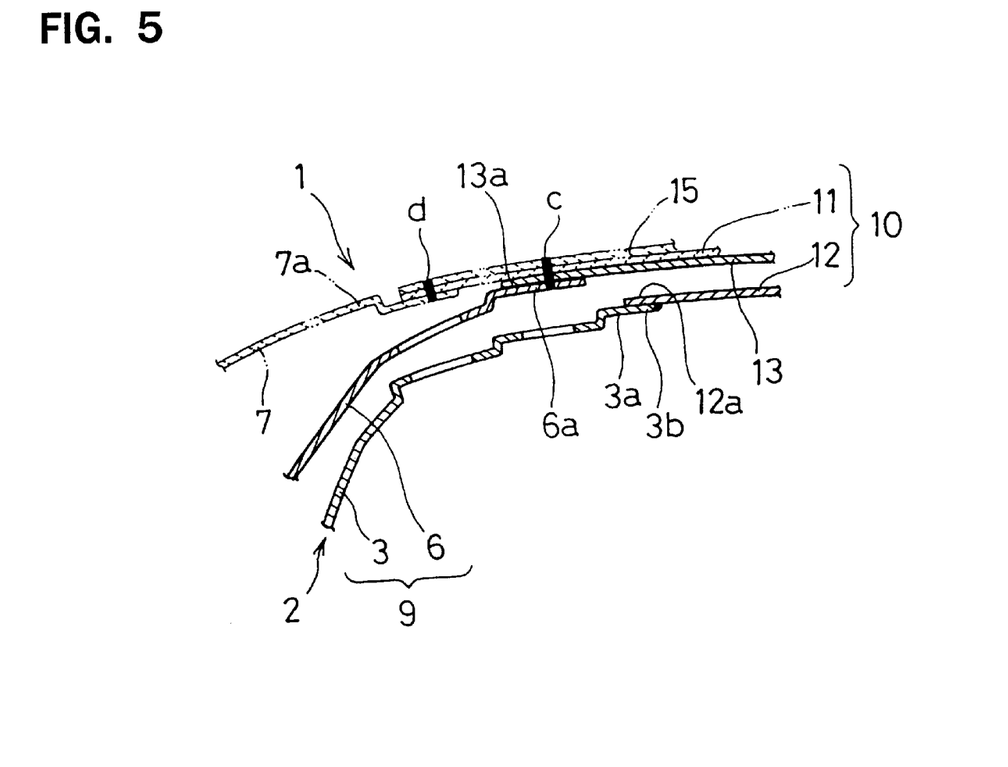
FIG. 5 is an enlarged sectional view taken along line 5—5 of FIG. 1.

The rear pillar gutter 7 is partially bent or inclined inwardly toward the center of the vehicle body to provide a gutter projection 7a which may be used as a connector for connecting a hard-to-shape portion of the rear outer panel 4 shown in FIG. 5.

The rear inner panel 3 is partially inclined or folded slightly inwardly toward the center of the vehicle body (toward a roof rail 10) to provide an inner projection 3a. Similarly, part of the rear pillar stiffener 6 is folded slightly inwardly toward the center of the vehicle body (toward the roof rail 10) to provide an outer projection 6a.

It is preferable that the inner projection 3a is as long as possible in so much as the rear inner panel 3 is foldable. The outer projection 6a is also selected to be of maximum possible length.

The roof rail 10 is positioned transversely of the vehicle body at an upper portion of the rear body and includes a roof rail outer member 11 at an upper level and a roof rail inner member 12 at a lower level, as shown in FIG. 4.

A hinge stiffener 13, serving as a reinforcing member, is mounted to an appropriate portion of the roof rail outer member 11 (as well as to an appropriate portion of the roof rail inner member 12 in FIG. 1). Part of the hinge stiffener 13 projects transversely outwardly of the vehicle body to thereby provide a stiffener projection 13a.

Figure 8:
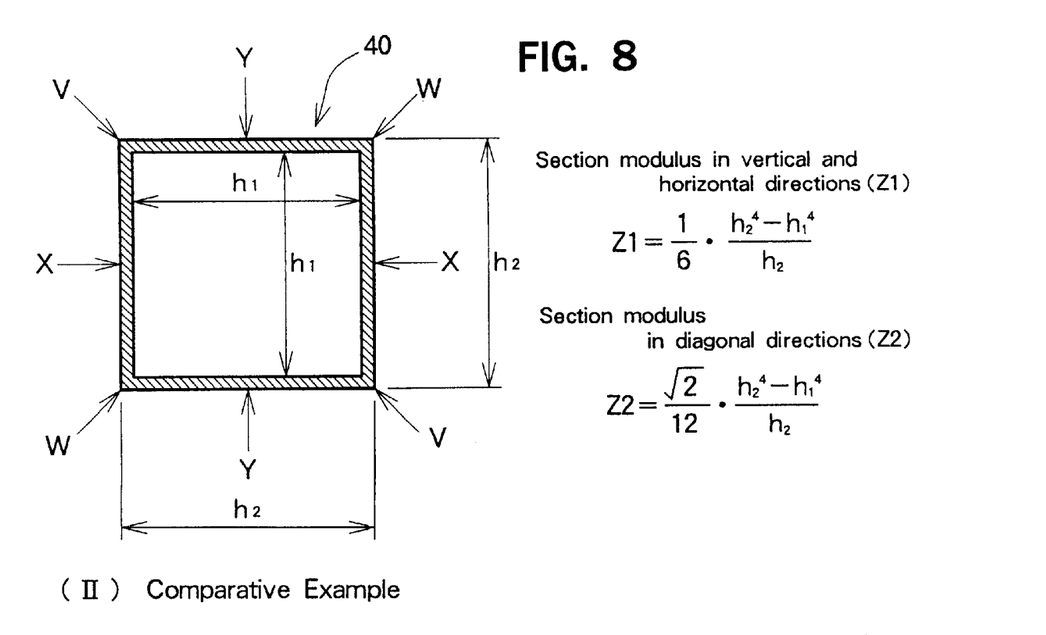
FIG. 8 is a schematic view illustrating a known structure (II) for comparison of it stiffness to that of the structure of FIG. 7.

The hinge stiffener 13 is connected to the roof rail outer member 11 and the roof rail inner member 12, and the stiffener has a central raised portion with two openings as shown for allowing attachment of a back or rear door 105, as shown in FIG. 8, to the roof rail 10.

Figure 2:
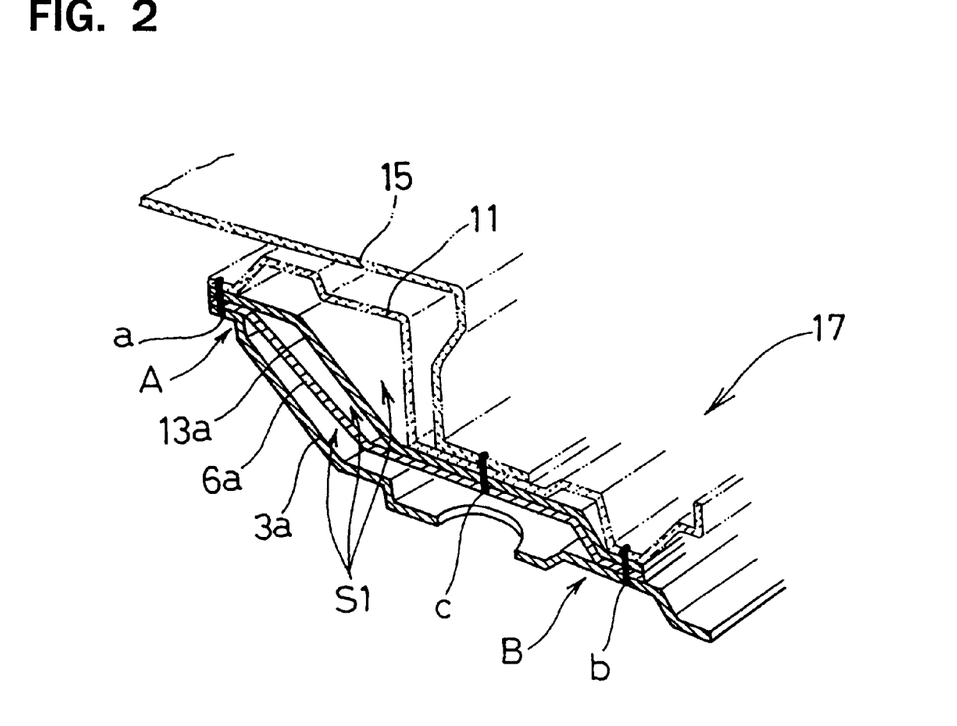
FIG. 2 is an enlarged sectional view taken along line 2—2 of FIG. 1.

FIG. 2 shows, on an enlarged scale, a section taken along line 2—2 of FIG. 1. The inner projection 3a, the outer projection 6a, the stiffener projection 13a and the roof rail outer member 11 are placed one over the other in the order in which given and connected at their ends A and B by spot welding as at "a" and "b". Similarly, the outer projection 6a, the stiffener projection 13a and a roof rail panel 15 are connected at their intermediate positions by spot welding as at "c".

The arrangement thus constructed presents a box-shaped structure 17 with a narrow closed gap or space defined by the inner projection 3a at the bottom and the roof rail outer member 11 at the top and lying in a front-to-rear or longitudinal direction with respect to the vehicle body.

Within the box-shaped structure 17, the outer projection 6a and the stiffener projection 13a extend diagonally between the ends A and B. These projections 6a and 13a serve as braces and partition the box-shaped structure to provide three closed sections S1 at a portion of the box-shaped structure disposed away from the rear panel 2 proximate a transverse center of vehicle body.

The roof rail panel 16 is used for covering an upper surface of the vehicle body.

Figure 3:
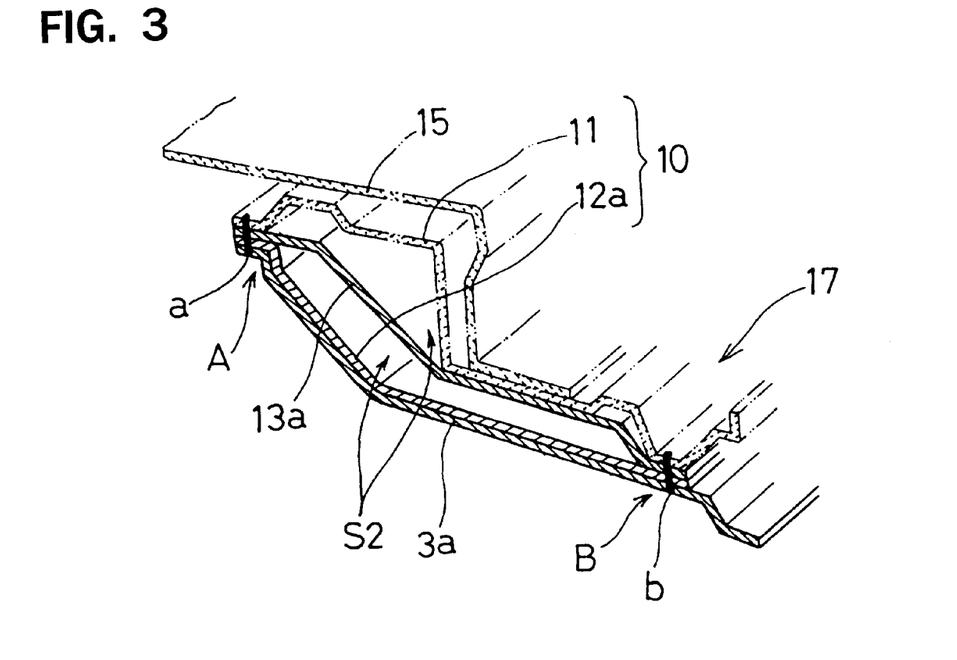
FIG. 3 is an enlarged sectional view taken along line 3—3 of FIG. 1.

FIG. 3 is an enlarged section taken along line 3—3 of FIG. 1. At this sectional position, the box-shaped structure 17 includes the roof rail outer member 11 and the inner projection 13a with the end 12a of the roof rail inner member 12 connected thereto.

In the box-shaped structure 17, the stiffener projection 13a is diagonally disposed. The stiffener projection 13a acts as a brace and divides the box-shaped structure 17 into upper and lower closed sections S2, again, a portion of the box-shaped structure disposed away from the rear panel 2 proximate the transverse center of the vehicle body.

FIG. 4 is an enlarged section taken along line 4—4 of FIG. 1, illustrating the mode of connection of the components forming the box-shaped structure 17 at its end A shown in FIG. 2.

The end 12a of the roof inner member 12 is connected at a position in which it does not lie over the outer projection 6a, to the end 3b of the inner projection 3a by spot welding as at "a". The corner of the reverse surface of the end 12a is connected in position to the inner projection 3(a) by MIG welding (inert gas metal arc welding using a consumable electrode).

In FIG. 4, the rear panel 2 includes the internally positioned rear inner panel 3 and the externally positioned rear outer panel 4. Similarly, the roof rail 10 includes the roof rail outer member 11 at an upper position and the roof rail inner member 12 lying under the outer member 11. The roof rail 10 is covered by the roof panel 15.

FIG. 5 is an enlarged sectional view taken along line 5—5 of FIG. 1, illustrating a mode of connection between the components forming the box-shaped structure 17 at its intermediate portion in a front-to-rear or longitudinal direction with respect to the vehicle body (see FIG. 2).

Again, the end 12a of the roof rail inner member 12 is joined with and welded to the end 3b of the inner projection 3a at a position in which it does not overlap with the outer projection 6a.

As shown in the figure, the rear pillar gutter 7 has a gutter projection 7a connected to the ends of the roof rail outer member 11 and the roof panel member 15 by spot welding as at "d". The position of the gutter projection 7a corresponds to the position of a roof rail groove M as shown in FIG. 4. Thus, the gutter projection 7a may be short in length, resulting in the rear pillar gutter 7 being simple in construction.

A mode of operation to achieve the connection between the rear pillar 9 and the roof rail 10 in the above arrangement will now be described with reference to FIG. 1, FIG. 5 and FIG. 6.

Figure 6:
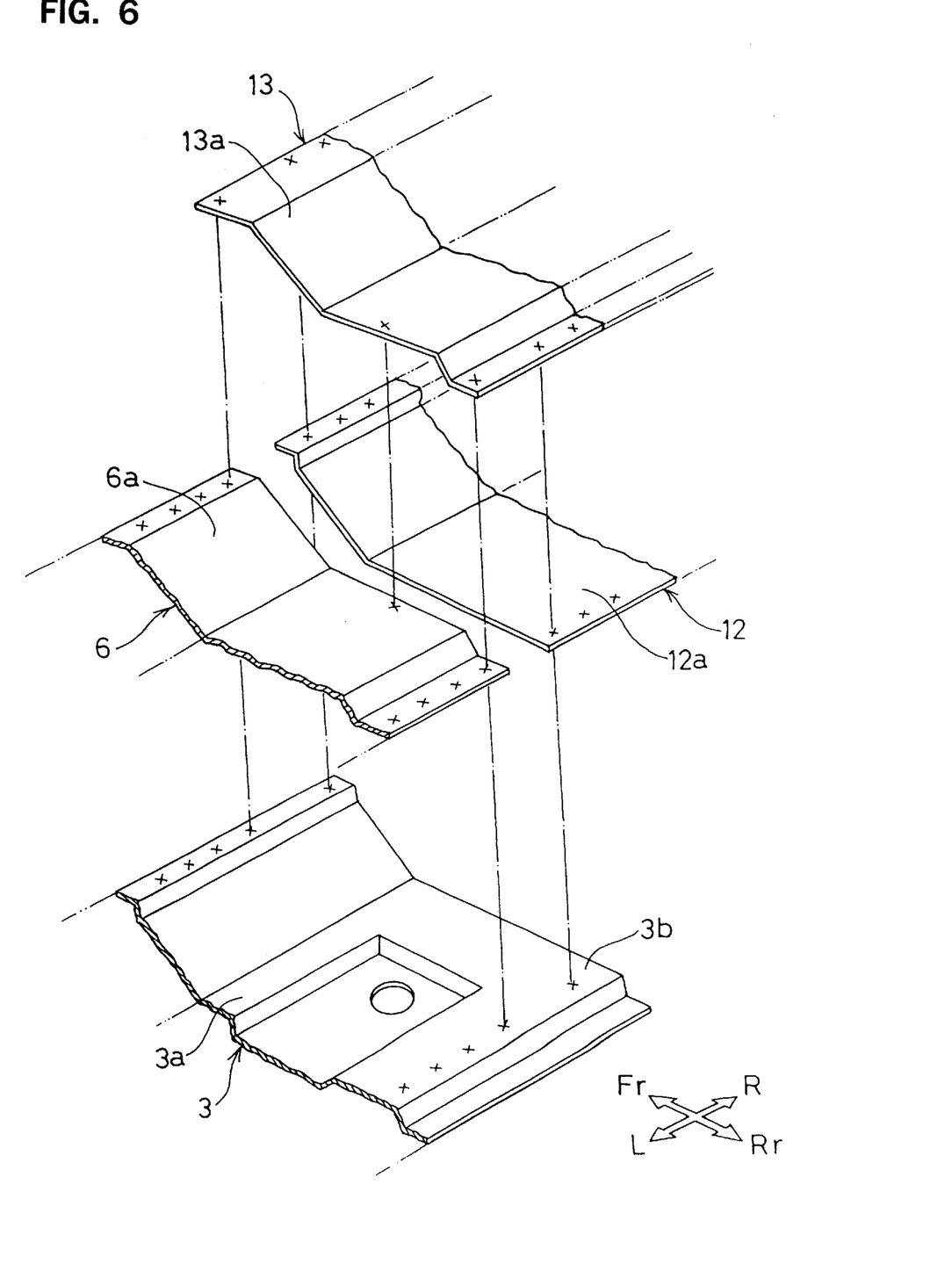
FIG. 6 is an exploded perspective view illustrating the connection between the rear pillar and the roof rail of the rear body structure according to the invention.

FIG. 6 is an exploded perspective view illustrating the connection between the rear pillar 9 and the roof rail 10 in the rear body structure according to the invention.

In the figure, arranged from bottom to top are the rear inner panel 3, its inner projection 3a, rear pillar stiffener 6, its outer projection 6a, roof rail inner member 12, its end 12a, hinge stiffener 13 and its end 13a.

Firstly, as shown in FIG. 1, the rear pillar stiffener 6 is laid upon the rear inner panel 3 and connected together by welding. As a result, the outer projection 6a is placed on the Inner projection 3a, as shown in FIG. 6. Then, the end 12a of the roof rail inner member 12 is laid upon the end 3b of the inner projection 3a. Thereafter, the projection 13a of the hinge stiffener 13 is placed upon the outer projection 6a of the rear pillar stiffener 6 and upon the end 12a of the roof rail inner member 12.

Subsequently, as shown in FIG. 5, the roof rail outer member 11 is laid on the stiffener projection 13a, and then the end of the roof rail outer member 11 is placed on the gutter projection 7a of the rear pillar gutter 7.

As shown in FIG. 6, the components 3a, 6a, 12a and 13a are firmly joined together at positions marked "x" by spot welding as at "d".

Lastly, as shown in FIG. 5, the components 6a, 11 and 15 are connected together by spot welding as at "c", Similarly, the components 7a, 11 and 15 are joined together by spot welding as at "d". The operation is completed by thereafter joining together the end 3b of the inner projection 3a and the end of the roof rail inner member 12 by MIG welding.

It should be noted that although only one manner of connecting the rear pillar 9 and the roof rail 10 has been described for illustration, other manners are also readily available.

Comparison will now be made between the box-shaped structure according to the invention and a comparative example in terms of their stiffness.

Figure 7:
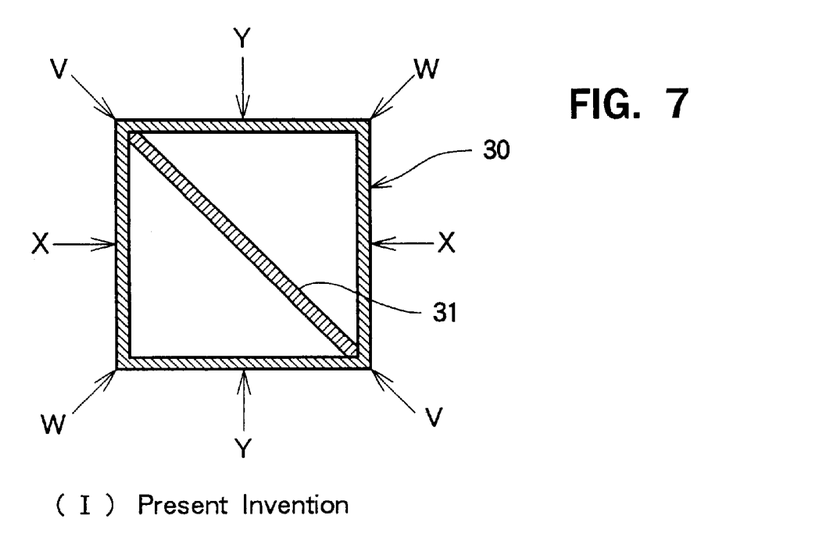
FIG. 7 is a schematic view illustrating the box-shaped structure (I) according to the invention

FIG. 7 and FIG. 8 respectively illustrate the invention structure and example structure for comparison.

FIG. 7 is a schematic view illustrating the structure according to the invention. The box-shaped structure 30 is hollow and of rectangular cross-section with a brace 31 extending diagonally of the structure.

Initially, the features of these structures are compared.

The brace member 31 shown in FIG. 7 corresponds to the outer projection 6a of the rear pillar stiffener 6 and/or the projection 13a of the hinge stiffener 13 in the box-shaped structure 17 of the embodiment shown in FIG. 2, or the projection 13a of the hinge stiffener 13 of the box-shaped structure shown in FIG. 3.

The brace member 31 serves to render the box-shaped structure 30 reinforced against external stresses applied thereto from horizontal and vertical (right-and-left and top-and-bottom) directions X and Y, and against external stresses applied from the diagonal directions V and W or the corners of the structure. Thus, the box-shaped structure 30 shows increased stiffness against stresses applied from left-and-right, top-and-bottom and corner directions.

FIG. 8 schematically illustrates a section of the box-shaped structure of the comparative example. The box-shaped structure 40 is hollow, and no diagonal brace member is provided therein.

The section modulus Z2 in the corner directions is smaller than the section modulus Z1 in the left-and-right (horizontal) and top-and-bottom (vertical) directions. Due to the absence of the diagonal brace member, the box-shaped structure 40 can be deformed relatively easily. Thus, the box-shaped structure 40 has sufficient stiffness against external stresses applied in horizontal and vertical directions but it has insufficient stiffness against stresses from the corner directions.

Accordingly, it is highly effective and meaningful to place the brace member 31 diagonally within such box-shaped structure 30, leading to increased stiffness in the structure.

In the connection between the rear pillar 9 and the roof rail 10, it is the box-shaped structure 17 (sectioned portions as shown FIGS. 2 and 3) which requires increased stiffness most. By virtue of the brace member (projection 13a and/or outer projection 6a shown in FIG. 2, or projection 13a shown in FIG. 3) positioned diagonally within the box-shaped structure 17, increased stiffness is produced therein.

The description has been made thus far with regard to the connection between the rear pillar 9 and the roof rail 10, which is on the left side of the vehicle. Such connection on the right side is identical with the connection on the left side, and its description will therefore be omitted.

The preferred embodiments of the invention has thus far been described with reference to the accompanying drawings. As already described, the invention firstly provided, as a rear body structure of a vehicle, a box-shaped structure which is defined jointly by the inner projection of the rear inner panel and the roof rail outer member arranged to extend transversely of the rear vehicle body at an upper portion thereof. As a result, the connection between the rear pillar and the roof rail has been imparted increased stiffness against external stresses applied in both top-and-bottom (vertical) and front-and-rear (longitudinal) directions.

Particularly, the invention provided a box-shaped structure in which brace means, consisting of the outer projection of the rear pillar stiffener provided for reinforcing the rear inner panel and/or of the stiffener projection of the hinge stiffener provided for reinforcing the roof rail outer member at an appropriate position thereof, extends diagonally within the box-shaped structure dividing the same into a plurality of closed sections. As a result, increased stiffness against a twisting stress can be obtained at the connection between the rear pillar and the roof rail. This arrangement also provides increases stiffness against external stresses applied from the directions of the corners of the closed sections, that is, from the same directions as the directions V of the brace means shown in FIG. 7, as well as from the directions W normal to the brace means.

It should also be noted that no additional element for reinforcement need be employed since the box-shaped structure is provided with brace means formed of the outer projection of the rear pillar stiffener and the projection of the hinge stiffener, both extending diagonally of the structure, and with the plurality of closed sections thus obtained therein. Since this arrangement requires employment of no additional components, production of the structure, which is simple in construction but with improved stiffness, will be allowed.

According to the invention, the roof rail inner member is connected to the inner projection at its position where it does not overlap the outer projection and a box-shaped structure is formed by such inner projection with the roof rail inner member connected thereto and the roof rail outer member, resulting in increased stiffness against external stresses applied vertically and longitudinally of the vehicle body.

In this box-shaped structure, the stiffener projection as brace means is also disposed diagonally to define a plurality of closed sections therein, whereby stiffness against a twisting stress is increased significantly. Also, as mentioned above, stiffness against external stresses applied to the corners of the closed sections is achieved by the structure of the invention.

Further, since the stiffener projection is disposed diagonally within the structure to thereby divide the same into a plurality of closed sections, it does not require use of any separate elements for reinforcement, enabling provision of the structure with increased stiffness and simple in construction.

Although preferred embodiments of the present invention have been described herein in detail, it will be appreciated by those skilled in the art that variations may be made thereto without departing from the spirit of the invention or the scope of the appended claims.

I claim:

1. A rear body structure of a vehicle, said rear body structure comprising:

a rear inner panel forming a rear side portion of a vehicle body and having an inner projection partially bent transversely inwardly of said vehicle body;

a rear pillar stiffener for reinforcing said rear inner panel, said rear pillar stiffener having an outer projection partially bent transversely inwardly of said body; and a roof rail disposed at an upper portion of said rear body structure, said roof rail including an upper roof rail outer member and a lower roof rail inner member, said roof rail outer member having a hinge stiffener as a reinforcing member, which has a stiffener projection projecting transversely outwardly of said vehicle body, said inner projection, said outer projection, and said stiffener projection being laid sequentially one over the other and joined together at ends thereof, said inner projection positioned at a bottom and said roof rail outer member positioned at a top jointly defining a box-shaped structure with bracing means diagonally extending within said box-shaped structure, whereby a plurality of closed sections are defined within said box-shaped structure.

2. A rear body structure according to claim 1, wherein said bracing means diagonally extending within said box-shaped structure consists of at least one of said stiffener projection and said outer projection.

3. A rear body structure according to claim 2, wherein said box-shaped structure includes said stiffener projection, acting as said bracing means, at a portion thereof proximate to a transverse center of said vehicle body.

4. A rear body structure according to claim 2, wherein said box-shaped structure includes said stiffener projection and said outer projection, jointly acting as said bracing means, at a portion thereof proximate to a transverse center of said vehicle body.

5. A rear body structure according to claim 1, wherein said roof rail inner member is connected to a portion of said inner projection where the inner projection does not overlap said outer projection.

6. A rear body structure according to claim 5, wherein an end of said roof rail inner member and said outer projection, with ends thereof disposed in opposed relation and separated in a transverse direction with respect to said vehicle body, are interposed between and connected to said inner projection and said hinge stiffener projection in a laminated fashion.

7. A rear body structure according to claim 1, wherein said bracing means define three closed sections within said box-shaped structure.

8. A rear body structure according to claim 1, further including a rear pillar gutter having a gutter projection, an end of said gutter projection being joined to an end of said roof rail outer member.

9. A rear body structure according to claim 1, wherein said hinge stiffener is fixed between said roof rail outer and inner members.

10. A rear body structure according to claim 1, wherein said hinge stiffener is adapted to have a door hinge connected thereto.

11. A rear body structure of a vehicle, said rear body structure comprising:

means for defining a rear pillar, including a portion of a rear inner panel forming a rear side of the vehicle body with an inner projection partially bent transversely inwardly of the vehicle body, and a stiffener reinforcing portion of the rear inner panel with an outer projection partially bent transversely inwardly of the vehicle body;

means for defining a roof rail at a rear upper portion of the vehicle body, including an upper roof rail outer member and a reinforcing hinge stiffener connected to said roof rail outer member and having a stiffener projection projecting transversely outwardly of the vehicle body;

said inner projection, said outer projection, and said stiffener projection being disposed together in a stacked manner and joined together at ends thereof;

said inner projection and said roof rail outer member jointly defining a box-shaped structure with said inner projection positioned at a bottom and said roof rail outer member positioned at a top of the box-shaped structure; and     bracing means disposed within said box-shaped structure to define a plurality of closed sections in said box-shaped structure.

12. A rear body structure according to claim 11, wherein said bracing means consists of at least one of said stiffener projection and said outer projection.

13. A rear body structure according to claim 11, wherein said bracing means comprises said stiffener projection and said outer projection.

14. A rear body structure according to claim 11, wherein said bracing means extends diagonally within said box-shaped structure.

15. A rear body structure according to claim 11, wherein said roof rail defining means further includes a lower roof rail inner member, and said hinge stiffener is connected between said roof rail outer member and said roof rail inner member.

* * * * *

UNITED STATES PATENT AND TRADEMARK OFFICE
CERTIFICATE OF CORRECTION

PATENT NO : 6,126,232
DATED : 03 October 2000
INVENTOR(S) : Takashi Nakano

It is certified that error appears in the above-identified patent and that said Letters Patent are hereby corrected as shown below:

On the cover page, in the "[57] ABSTRACT", 12th line, change "joint" to --jointly--.

Column 1, line numbered between 49 and 50, after "panel" insert a comma.

Column 2, line 28, delete "(";
        line 29, delete ")".

Column 3, line 62, after "invention" insert a period;
        line 64, change "it" to --its--.

Column 4, line 3, change the comma to a period;
        line 11, before "discussed" insert --foregoing--;
        line 12, delete "foregoing prior art";
        line 18, change "9" to --10--.

Column 5, line 13, change "16" to --15--.

Column 7, 16th line, change "embodiment" to --embodiments--;
        line numbered between 36 and 37, change "increases" to --increased--.

Signed and Sealed this

Eighth Day of May, 2001

*Attest:*

NICHOLAS P. GODICI

*Attesting Officer*  *Acting Director of the United States Patent and Trademark Office*